(12) United States Patent
Salazar et al.

(10) Patent No.: US 7,496,743 B1
(45) Date of Patent: Feb. 24, 2009

(54) MODELING OPERATING SYSTEM INSTANCES

(75) Inventors: Arthur Salazar, Oceanside, CA (US);
Boman Irani, Los Altos Hills, CA (US);
Roman Zajcew, La Mesa, CA (US);
Scott Carter, San Diego, CA (US);
David L. Isaman, San Diego, CA (US);
David Nielsen, Carlsbad, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 800 days.

(21) Appl. No.: 10/983,424

(22) Filed: Nov. 8, 2004

(51) Int. Cl.
*G06F 9/00* (2006.01)
*G06F 9/46* (2006.01)
*G06F 15/177* (2006.01)

(52) U.S. Cl. ................. 713/2; 713/1; 718/104
(58) Field of Classification Search ........ 713/1, 713/2, 100; 718/104
See application file for complete search history.

(56) References Cited

U.S. PATENT DOCUMENTS

| | | | |
|---|---|---|---|
| 4,787,031 A * | 11/1988 | Karger et al. | 718/100 |
| 6,647,508 B2 * | 11/2003 | Zalewski et al. | 714/3 |
| 6,687,820 B2 * | 2/2004 | French et al. | 713/2 |
| 6,912,719 B2 | 6/2005 | Elderon et al. | |
| 6,918,122 B2 | 7/2005 | Matula et al. | |
| 6,990,573 B2 * | 1/2006 | Cherian et al. | 713/1 |
| 7,055,026 B2 * | 5/2006 | Gere | 713/100 |
| 7,082,521 B1 * | 7/2006 | Nanja | 713/1 |
| 7,099,477 B2 * | 8/2006 | Bade et al. | 380/279 |
| 7,143,223 B2 * | 11/2006 | Hack et al. | 710/266 |
| 7,146,602 B2 * | 12/2006 | Frerking et al. | 717/118 |
| 7,177,915 B2 * | 2/2007 | Kopchik | 709/217 |
| 7,299,468 B2 * | 11/2007 | Casey et al. | 718/104 |
| 2002/0032850 A1 * | 3/2002 | Kauffman | 712/31 |
| 2003/0195995 A1 * | 10/2003 | Tabbara | 709/313 |
| 2006/0136913 A1 * | 6/2006 | Sameske | 718/1 |
| 2006/0212870 A1 * | 9/2006 | Arndt et al. | 718/104 |
| 2006/0242398 A1 * | 10/2006 | Fontijn et al. | 713/2 |
| 2007/0106993 A1 * | 5/2007 | Largman et al. | 718/104 |

* cited by examiner

*Primary Examiner*—Mark Connolly
(74) *Attorney, Agent, or Firm*—Meyertons Hood Kivlin Kowert & Goetzel, P.C.; Rory D. Rankin

(57) ABSTRACT

A method and mechanism for managing operating system instances in a computing system. A computing system is configured to enable users to model and manage operating system instances. One or more defined operating system instances may be created and stored for future use. Each of the defined operating system instances may include a description of required resources. In addition, the definition of desired and/or optimal resources may be specified. In response to an attempt to realize an operating system instance, a determination is made as to whether resources allocated for the operating system instance are adequate. If the allocated resources are inadequate, further resources may be allocated. In addition, a determination may be made as to whether a standby mode is indicated for the operating system instance. If a standby mode is indicated, the operating system instance may be realized but not booted.

20 Claims, 6 Drawing Sheets

MODELING OPERATING SYSTEM INSTANCES

BACKGROUND OF THE INVENTION

1. Field of the Invention

The invention relates to computing systems and, more particularly, to the modeling and management of operating system instances and services.

2. Description of the Related Art

Many enterprises today utilize multiprocessing computer systems, and other systems in which resources are shared, cooperate, or otherwise function to accomplish various tasks. In some cases, these systems include multiple resources which are allocated for particular tasks. In such cases, resources which are allocated for particular tasks, or which are allocated for use by particular groups, may be logically grouped together into a separate domain. For example, a single system may be configured with separate domains for different departments in an organization such as accounting and research. Domains may be configured in such a manner that each domain operates independently of the other and does not have access to the resources or data of the other. Isolating domains from one another may also offer an increased degree of security.

Generally speaking, centralized management of such systems is desired. Numerous management and system administration tasks may be handled by a service processor. Generally speaking, a service processor is an adjunct processing unit that supports the operation of an enterprise server. Examples of such management tasks include inserting or removing a system board, logically attaching or detaching a board, creating, removing, or renaming a domain, performing a bringup operation on a domain, rebooting a domain, automatic domain recovery operations due to events such as system panics or hardware failures, and so on.

While direct management of hardware resources in a computing system enable an administrator to configure systems in a variety of ways, such an approach can be cumbersome and lacking in flexibility.

Accordingly, a method and mechanism for efficient computing system management is desired.

SUMMARY OF THE INVENTION

Methods and mechanisms for modeling and managing operating system instances and their resources in a computing system are contemplated.

In one embodiment, a system is contemplated in which operating system instances may be modeled and described with data structures which are then stored. These described operating system instances may subsequently be called upon and booted. In addition, rather than directly managing domains, users may manage operating system instances. In one embodiment, the system includes service processor software which receives configuration information from users describing attributes of an operating system instance and desired resources. Descriptions of multiple operating system instances may be created and stored. It is also contemplated that more operating system instances than the system is capable of running simultaneously may be created and stored.

Various embodiments may include the use of predetermined profiles which may serve as a template for the creation of new defined operating system instances. Further resources may also be specified which may then be added to the operating system instance description. In one embodiment, operating system instances described by a user may include attributes which include various desired resources such as processors, memory, and so on. The service processor software generally views the underlying hardware as a collection of available resources and allocates the necessary resources to meet the requirements of the described operating system instance. In this manner, virtual systems may be described and managed by a user.

Also contemplated is a system configured to boot predefined operating system instances. Booting an operating system instance may include determining whether a resourced operating system instance exists; determining whether resources allocated for the resourced operating system instance are adequate; and in the event the resources allocated for the operating system instance are not adequate, performing a provisioning activity in order to allocate additional resources to the resourced operating system instance.

Figure 1:
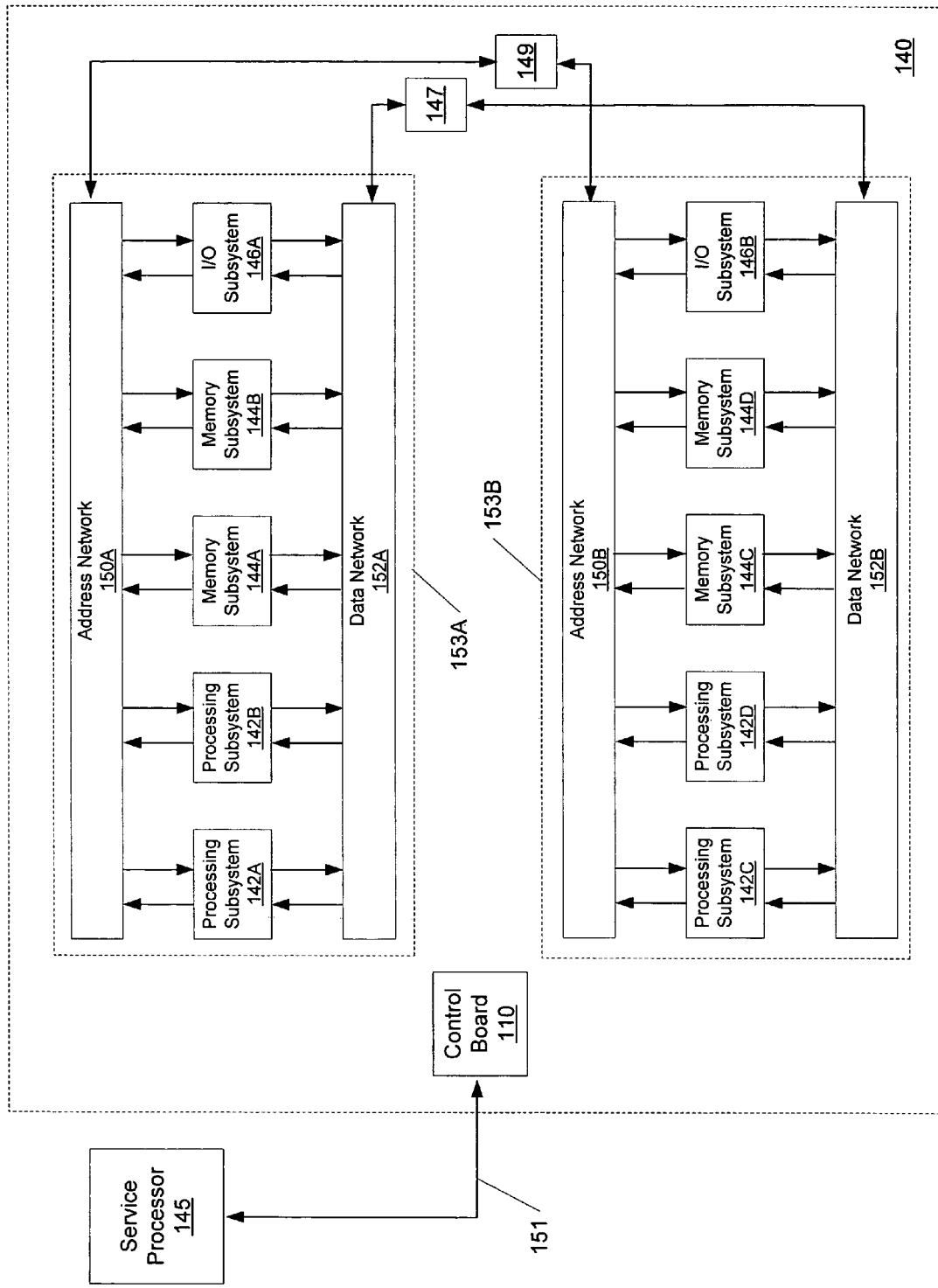
FIG. 1 depicts one embodiment of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 is a block diagram of one embodiment of a computer system 140. Computer system 140 includes processing subsystems 142A and 142B, memory subsystems 144A and 144B, and an I/O subsystem 146 interconnected through an address network 150 and a data network 152. In addition, a service processor 145 is shown coupled to the system via bus 151. In the example shown, service processor 145 is coupled to a control board 110 which is generally configured to configure and control system 140. Computer system 140 may be referred to as a "platform". As used herein, the term "platform" generally refers to a group of clients which may share common address and data networks. In the embodiment of FIG. 1, each of processing subsystems 142, memory subsystems 144, and I/O subsystem 146 may be considered a client. It is noted that various embodiments of computer system 140 may employ any number of clients. Elements referred to herein with a particular reference number followed by a letter will be collectively referred to by the reference number alone. For example, processing subsystems 142A-142B may be collectively referred to as processing subsystems 142.

Generally speaking, each of processing subsystems 142 and I/O subsystem 146 may access memory subsystems 144. Each client in FIG. 1 may be configured to convey address transactions on address network 150 and data on data network 152 using split-transaction packets. Typically, processing subsystems 142 include one or more instruction and data caches which may be configured in any of a variety of specific cache arrangements. For example, set-associative or direct-mapped configurations may be employed by the caches within processing subsystems 142. Because each of processing subsystems 142 within node 140 may access data in memory subsystems 144, potentially caching the data, coherency must be maintained between processing subsystems 142 and memory subsystems 144.

Memory subsystems 144 are configured to store data and instruction code for use by processing subsystems 142 and I/O subsystem 146. Memory subsystems 144 preferably comprise dynamic random access memory (DRAM), although other types of memory may be used. Each address in the address space of node 140 may be assigned to a particular memory subsystem 144, referred to as the home subsystem of the address. Further, each memory subsystem 144 may include a directory suitable for implementing a directory-based coherency protocol. In one embodiment, each directory may be configured to track the states of memory locations assigned to that memory subsystem within node 140. For example, the directory of each memory subsystem 144 may include information indicating which client in node 140 currently owns a particular portion, or block, of memory and/or which clients may currently share a particular memory block.

In the embodiment shown, data network 152 is a point-to-point network. However, it is noted that in alternative embodiments other networks may be used. In a point-to-point network, individual connections exist between each client within the node 140. A particular client communicates directly with a second client via a dedicated link. To communicate with a third client, the particular client utilizes a different link than the one used to communicate with the second client.

Address network 150 accommodates communication between processing subsystems 142, memory subsystems 144, and I/O subsystem 146. Operations upon address network 150 may generally be referred to as address transactions. When a source or destination of an address transaction is a storage location within a memory subsystem 144, the source or destination is specified via an address conveyed with the transaction upon address network 150. Subsequently, data corresponding to the transaction on the address network 150 may be conveyed upon data network 152. Typical address transactions correspond to read or write operations. A read operation causes transfer of data from a source outside of the initiator to a destination within the initiator. Conversely, a write operation causes transfer of data from a source within the initiator to a destination outside of the initiator. In the computer system shown in FIG. 1, a read or write operation may include one or more transactions upon address network 150 and data network 152.

Service processor 145 is configured to manage platform 140. For example, service processor 145 may be configured to facilitate (i) inserting or removing system resources, (ii) logically attaching or detaching resources, (iii) creating, removing, or renaming a domain, (iv) performing a bring-up operation on a domain, (v) rebooting a domain, (vi) performing automatic domain recovery operations due to events such as system panics or hardware failures, and so on. In one embodiment, domains are configured to contain particular system boards and the components such as CPUs, and memory chips that are connected to the boards. Each domain may be electrically isolated into hardware partitions to ensure that a hardware or software failure in one domain does not affect the other domains in the system.

Figure 2:
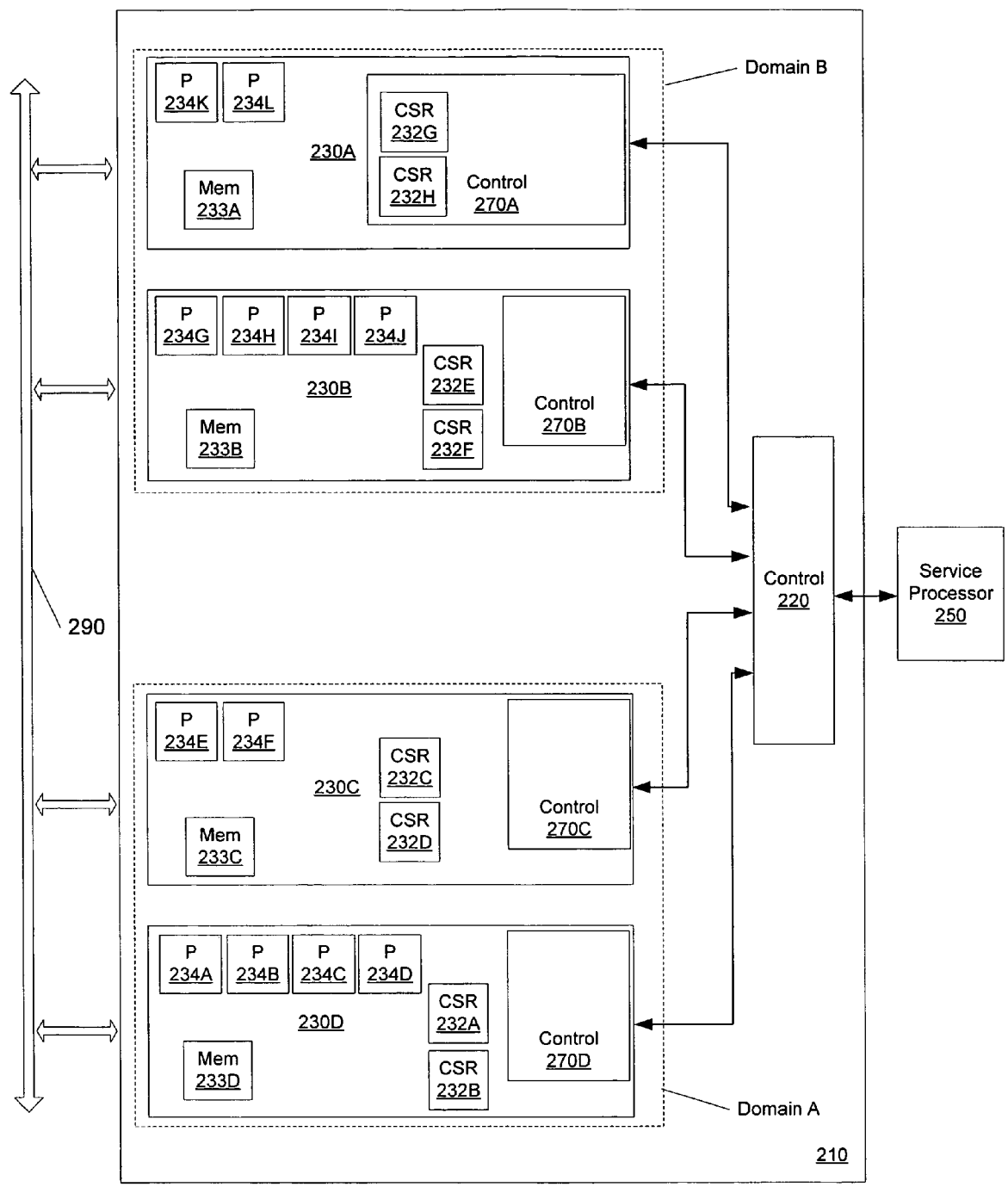
FIG. 2 depicts one embodiment of a computing system.

Turning now to FIG. 2, one embodiment of a platform 210 is depicted which is configured to enable configuration of resources, including the creation and destruction of domains. In the embodiment shown, platform 210 includes four system boards 230A-230D, and a control board 220. Each of system boards 230 includes processors 234, memory 233, control and status registers 232, and control circuitry 270. System boards 230 are coupled to control board 220. Also illustrated is a service processor 250 configured to manage platform 210. In one embodiment, service processor 250 is configured to communicate with platform 210 via a private Ethernet link, though other embodiments are possible and are contemplated. Service processor 250 may be configured to communicate with each of boards 230, as well as individual components of boards 230, through control board 220. Also illustrated is an operations bus 290 which is coupled to numerous components in the system 210 and enables communication among such components. In one embodiment, operations bus 290 comprises a network including point-to-point links between components in the system 210.

Control and status registers 232 are generally configured to maintain either status information concerning the operation of a corresponding system board 230, or registers 232 are utilized in configuring operation of a corresponding board 230 and its components. In one embodiment, platform 210 comprises a backplane to which system boards 230 and control board 220 are attached. The platform backplane may include address and data buses which are utilized by system boards 230 or other clients or components of the system 210. It is noted that other implementations of platform 210 are possible. For example, other embodiments may not utilize individual system boards 230 or a backplane. Rather, system components and circuitry may be integrated into a single chip. Numerous alternatives are possible.

In the embodiment of FIG. 2, system boards 230 have been configured into separate domains. Domain A includes system board 230C and system board 230D. Domain B includes system board 230A and 230B. Domains A and B may be configured to run independent operating systems which may be the same or different operating systems. Certain control and status registers 232 may be configured with differing access rights. For example some control and status registers 232 may be accessible by both processors 234 and service processor 250, while others are only accessible by service processor 250. Generally speaking, though not necessarily, control and status registers 232 which are accessible by processors 234 are accessible only by processors within the same domain. Accordingly, control and status registers 232A and 232B may be accessible by processors 234A-234F, but not by processors 234G-234L. All control and status registers 232 are generally accessible by service processor 250.

In the embodiment shown, control circuitry 270 is configured to manage access to each of the illustrated control and status registers 232. In one embodiment, control circuitry 270 may represent a particular application specific integrated circuit (ASIC) configured to perform a specific system board 230 function. In such an embodiment, the control and status registers 232 illustrated in a particular board 230 may be registers within the control circuit 270 of that board 230 and may correspond to the control and status of that particular control circuit. For example, in one embodiment control circuit 270 may represent a memory controller.

Limiting access to certain registers 232 ("protected" registers) by only service processor 250 may be necessary to enhance both security and reliability. For example, accidental modifications to particular registers 232 may cause undesirable changes in system configuration which may lead to data loss, system failure, or other unpredictable results. Consequently, certain control and status registers 232 are made non-accessible by other than the service processor 250. In addition to accidental register 232 modifications, intentional and/or otherwise malicious modification are possible may also occur if control and status registers 232 are completely open to access. Typically the service processor 250 is operated by a system administrator who may manage the system in a controlled manner.

In one embodiment, particulars of the hardware such as boards 230 are generally hidden from the user. Rather than directly specifying the particulars of a configuration (e.g., domain A comprises boards 230C and 230D, etc.), the user may simply indicate a need or desire for a particular number of processors, a particular amount of memory, and so on. In response to receiving the description, the service processor may then evaluate the currently available resources and perform the actual resource allocations and configurations necessary to meet the user's request. Based upon this paradigm, users may view operating system (OS) instances as a collection of managed entities or resources.

Figure 3:
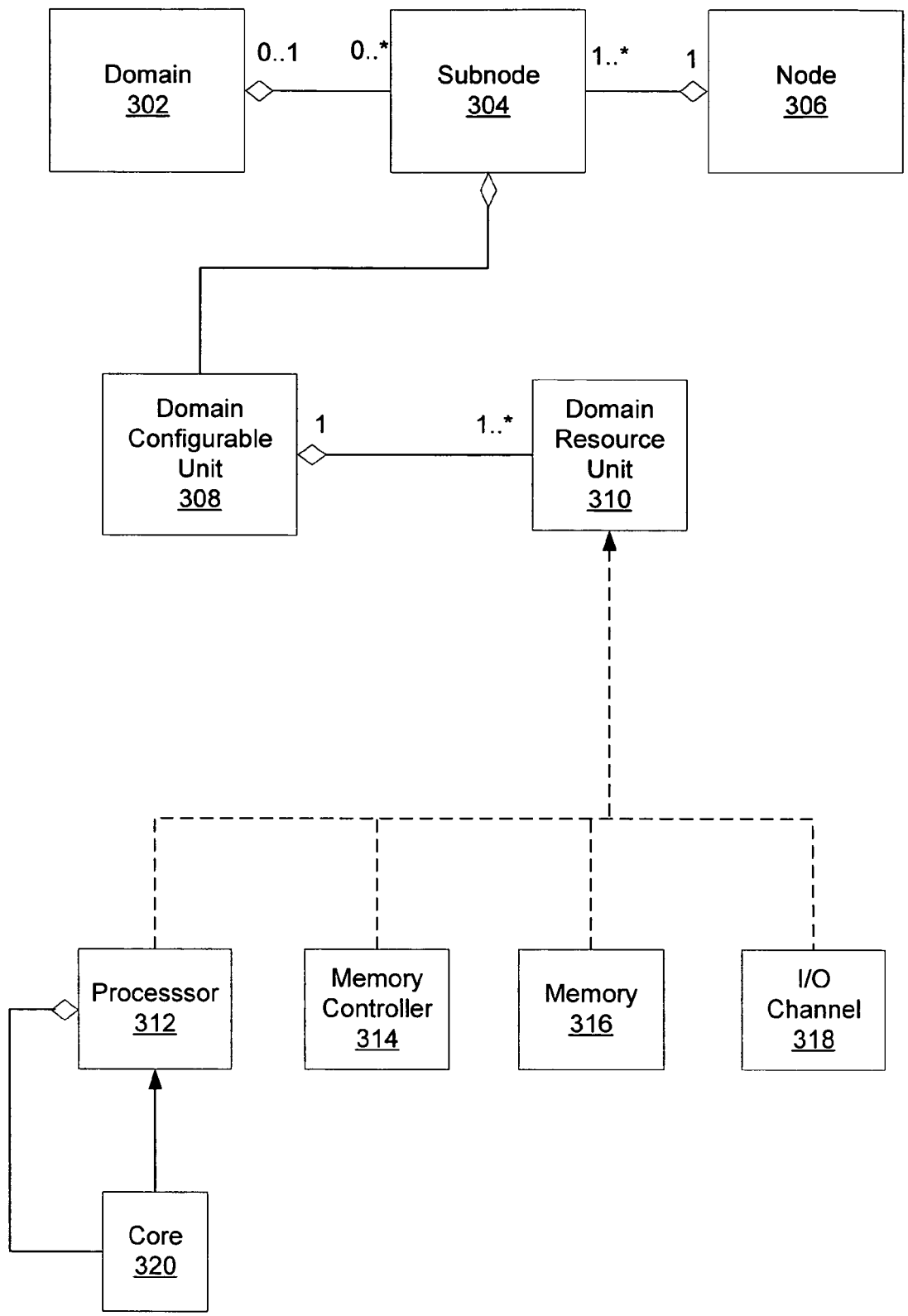
FIG. 3 depicts one embodiment of the relationship between various resources and components in a computing system.

FIG. 3 depicts one embodiment of the relationship of resources within a system. In the example shown, a unified modeling language type notation is utilized to depicts relationships between entities. As shown, a domain 302 may have zero or more subnodes and a node 306 may have one or more subnodes. A subnode 304 may have a domain configurable unit (DCU) 308. In one embodiment, a domain configurable unit 308 may comprise a board such as one of boards 230 depicted in FIG. 2. Each domain configurable unit 308 may then have one or more domain resource units (DRUs) 310. Domain resource units may corresponds to various allocable resources within a particular domain configurable unit. For example, each of the processor 234 and memory 233 components within a particular board 230 as shown in FIG. 2 may comprise a domain resource unit 310. FIG. 3 illustrates four examples of resources which may correspond to domain resource unit 310. A processor 312, memory controller 314, memory 316, and I/O channel 318 are illustrated. Also illustrated is a processor 312 which may comprise more than one core 320. In one embodiment, a DCU (Domain Configurable Unit) is the smallest unit of CPU, Memory, or I/O functionality that is used to build a domain. Also, in one embodiment a DRU (Domain Resource Unit) is the smallest unit of CPU, Memory, or I/O functionality that can be exclusively assigned to an OS instance.

As discussed above, domains may be built by a service processor in support of OS instances. Generally speaking, in one embodiment domains are not managed or even seen by users. Rather, it is OS instances which are managed by users and are generally visible to users in a manner similar to the way domains were in prior art systems. OS instances may have associated with them a number of attributes. For example, attributes may include a name, resources, a run state, and a priority. In one embodiment, a domain may generally comprise a sufficient set of domain configurable units (DCUs) such as processors, memory, and I/O channels. The domain may then have the appearance of a general purpose computer and can support running arbitrary programs.

It is also noted that some system software models may provide for multiple levels of supervisors. For example, some software models may utilize an intermediate layer between the hardware and one or more supervisors. In this manner the hardware layer is abstracted from the supervisor or operating system. In some models this intermediate layer may be referred to as the hypervisor. The supervisor then runs under the control of the hypervisor and user programs run under the control of the supervisor. In various embodiment, an OS instance may either run directly on a domain, or the system could have a hypervisor that runs on the domain, and then one or more OS instances could execute on the hypervisor.

Figure 4:
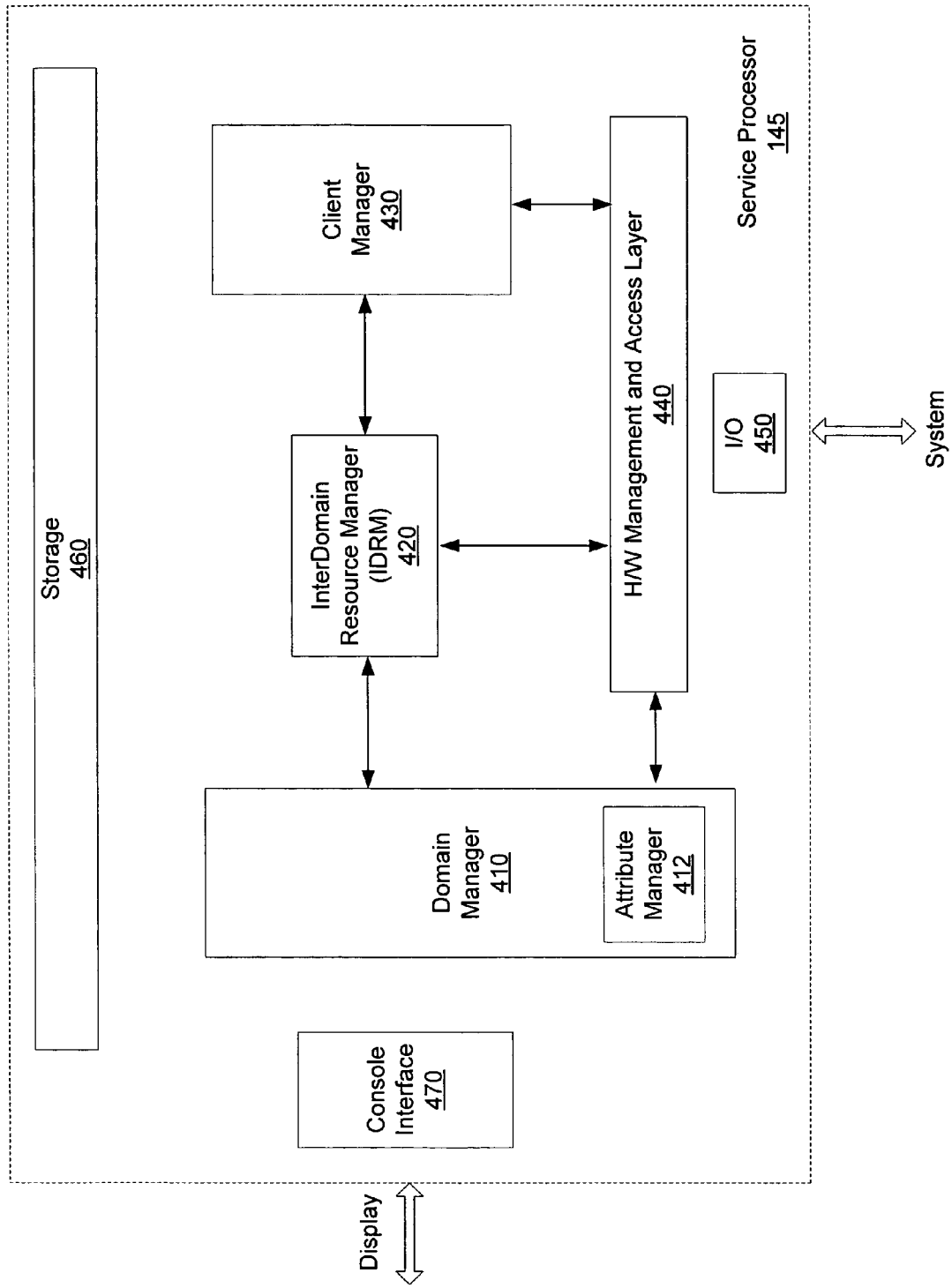
FIG. 4 depicts one embodiment of a service processor.

Turning now to FIG. 4, one embodiment of some of the components of a service processor 145 are depicted. Generally speaking, the components depicted in FIG. 4 represent software components executing within a user space of a service processor operating system. Service processor 145 in FIG. 4 includes a domain manager 410, interdomain resource manager (IDRM) 420, a client manager 430, and a hardware management and access layers 440. In addition, service processor 145 includes storage 460, a console interface 470, and an I/O unit 450. Domain manager 410 includes an attribute manager 412. In the embodiment shown, domain manager 410 is generally responsible for creating, destroying, and managing domains. Client manager 430 is generally responsible for discovery and tracking of system resources. Interdomain resource manager 420 is responsible for facilitating communication between the domain manger 410 and the client manager 430. Domain attribute manager 412 may generally communicate via IDRM 420 to determine resources available in the system. Finally, the H/W management and access layers 440 provide access to the hardware components of the system via I/O unit 450.

In one embodiment, a user accesses service processor 145 via the console interface 470. The user describes an OS instance which is then stored in storage 460 which may comprise local storage. Alternatively, described OS instances may be stored non-locally. In one embodiment, OS instance descriptions may include both a minimum set of required resources and an optimal set of resources. In addition, specific named resources (e.g., a particular database or storage device) may be provided in the description as well.

In one embodiment, OS instances may generally be either described (DOSI) or resourced (ROSI). Generally speaking, an OS instance is an instance of an operating system that can be brought up on a domain. A described OS instance is an OS instance which (1) is defined with a name and all other attributes, (2) may or may not have resources assigned, (3) is managed by the interdomain resource manager 420, and (4) is not assigned to a domain. Accordingly, a DOSI is generally the definition of an OS instance that is yet to be resourced by assigning DCUs to it's required DRUs. On the other hand, a resourced OS instance (ROSI) is an OS instance which (1) is defined with a name and all other attributes, (2) has resources assigned, (3) is managed by the service processor software, and (4) is assigned to a domain so that it can run. It is noted that descriptions of resources may be provided in any number of ways. Accordingly, a ROSI is generally an OS instance which is assured it has a domain to execute on that has been configured to meet all of the OS instance's resource requirements.

For example, one description may include a "CPU faster than 2.5 GHz, with at least 256 Mbytes of cache. Note that such a description does not specify a particular resource. Rather, the description merely describes a type of resources with various features. These described, but non-specific resources, may be referred to as "described" resources. Actual resources which are assigned to satisfy such descriptions are generally not assigned until boot time. In contrast to described resources, other resources may be specifically named. Specifically named resources may be referred to as "named" resources.

In one embodiment, resources are assigned by the interdomain resource manager 420. In one embodiment, certain resources may be reserved. Such reservations will be honored where possible. As noted above, resource allocation is performed dynamically at the time of boot. Upon each boot, resources are evaluated to determine availability. Resources which are already assigned or reserved may be kept. Generally speaking, resources are not unassigned until needed elsewhere. In addition, the IDRM 420 may also be responsible for domain reconfiguration. Managing OS instances may be performed via IDRM 420. Some examples of actions which may be taken through the IDRM 420 include the following:

CreateOSI—used to create an OS instance.
RemoveOSI—used to delete an OS instance.
ModifyOSI—used to modify an existing OS instance.
ShowOSI—used to display an OS instance.
Setkeyswitch—used to enable or disable an OS instance.
Console
AddDRU—used to add a domain resource unit.
RemoveDRU—used to remove a domain resource unit.
ShowDCUs—used to display domain configurable units.

FIG. 3 above provided an illustration of the relationship between various entities within a system. In addition to that described above, the following description provides further detail concerning the relationship between domain configurable units and domain resource units. In one embodiment, DCUs are made up of one or more DRUs. DCUs are assigned to domains by the service processor software. DRUs are assigned to OS instances by the IDRM component 420. In one embodiment, DCUs cannot span domains. In addition, while users may describe how they want DRUs assigned, all DRUs in a particular DCU are assigned to a single domain. Further, DRUs cannot span OS instances. However, DCUs may span OS instances (i.e., not all DRUs within a given DCU need be assigned to the same OS instance). Finally, DRUs in a domain can be assigned to different OSIs in that domain. It is noted that alternative embodiments may provide for differing requirements or relationships than that described above.

Figure 5:
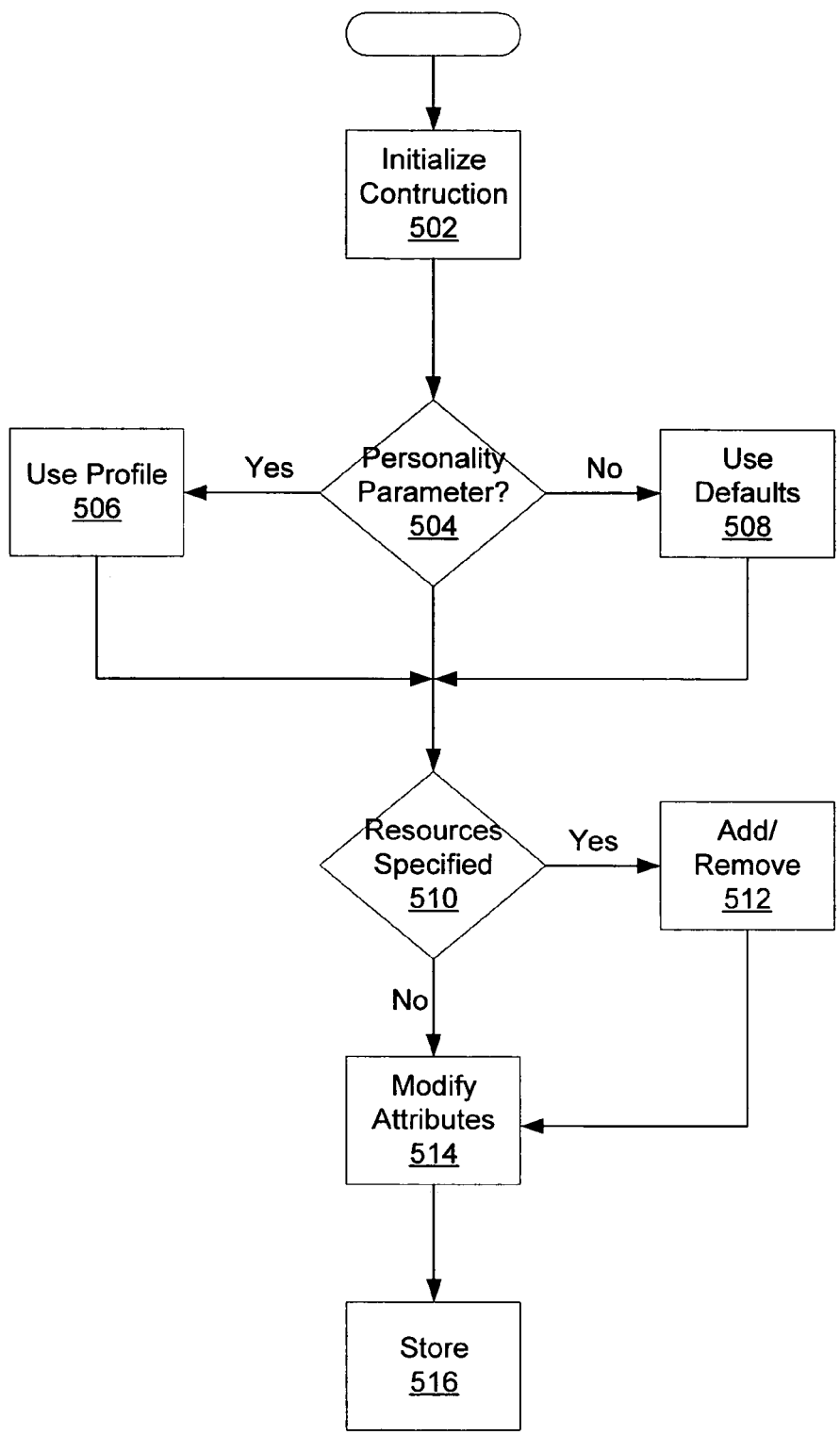
FIG. 5 illustrates one embodiment of a method for creating an operating system instance.

Turning now to FIG. 5, one embodiment of a method for creating an OS instance is depicted. Subsequent to initializing construction of an OS instance (block 502), a determination is made as to whether or not a personality parameter is indicated (decision block 504). For example, in one embodiment a personality parameter may comprise an indication to use a predetermined profile. If a personality parameter is indicated, then the corresponding profile is accessed and utilized to provide initial values and attributes for the OS instance. Profiles and other predetermined values may be stored in storage 460. On the other hand, if no personality parameter is indicated (decision block 504), then no predetermined values are used. Alternatively, if no personality parameter is indicated, a set of default values and attributes may be utilized (block 508). If the user has specified resources (block 510), then corresponding resources are allocated (or de-allocated) from the OS instance being defined. Resources may be de-allocated in some cases where the default or personality parameters include resources which are either not required or are otherwise undesirable. If the user has specified any particular parameters, then such parameters may be used to modify (block 514) the OS instance parameters according to the input parameters. For example, the user may generically specify a minimum of two CPUs. However, an additional parameter may indicated the CPUs should optimally be at 2.5 GHz. Finally, the completed OS instance description is stored (block 516).

Ordinarily, though not necessarily, the stored OS instance will be given a descriptive name. For example, an OS instance defined for purposes of running an enterprise's end of month accounting processes may be named OSIAccounting. Another OS instance defined for purposes of daily operations may be named OSIDaily. Numerous such examples are possible. Each of any number of OS instances may be defined and stored in advance. At the desired time, a particular OS instance may then be selected for boot.

Figure 6:
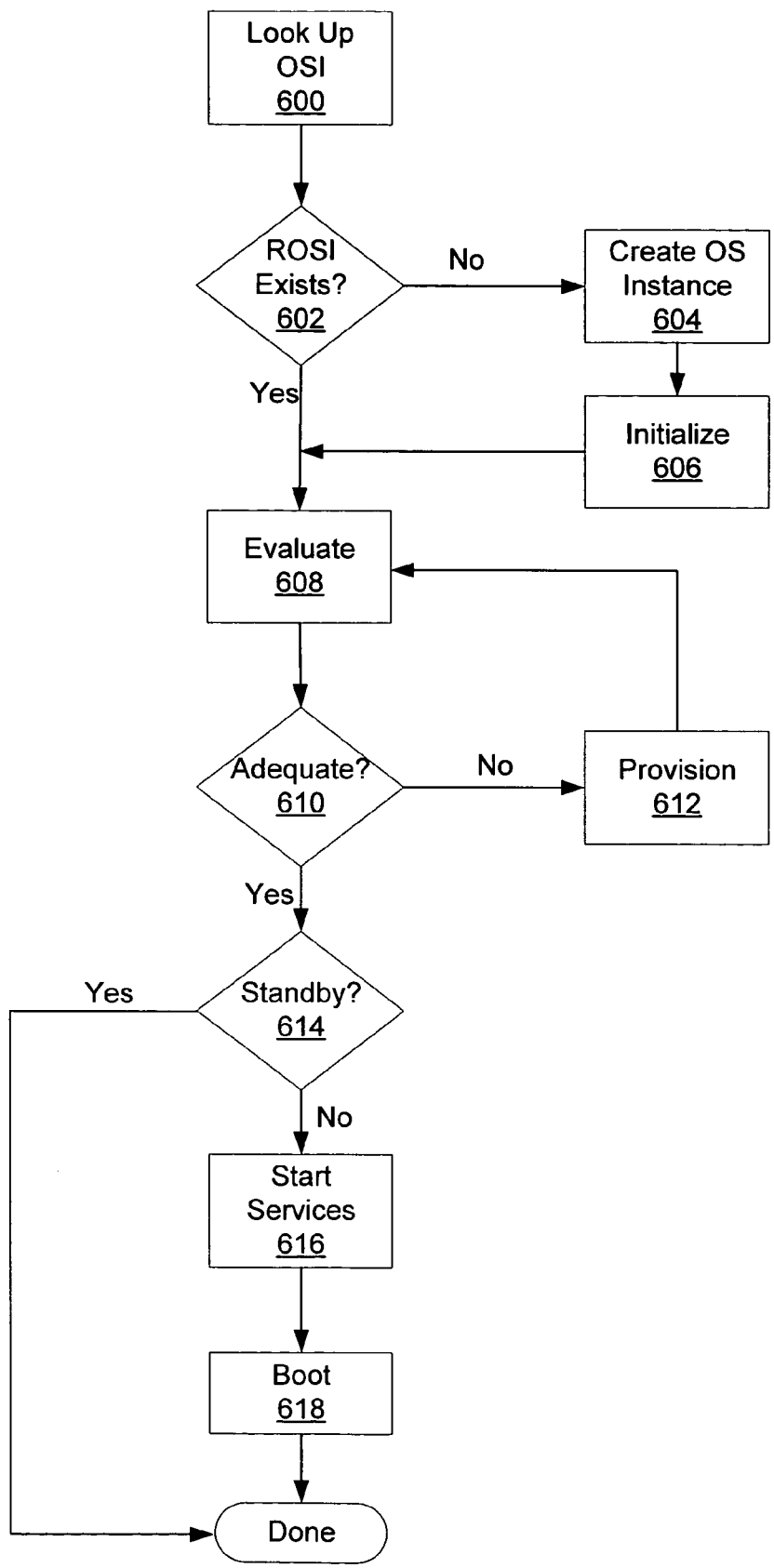
FIG. 6 illustrates one embodiment of a method for booting an operating system instance.

FIG. 6 illustrates one embodiment of a method for realizing an OS instance. In the discussion above, operating system instances were defined and stored. However, the defined operating system instances were not unrealized in the sense that no provisioning of actual resources and no boot of the described operating system instance occurred. In contrast to the above, FIG. 6 depicts one embodiment of the realization of an operating system instance.

In response to detecting a particular OS instance is to be realized, a look up may be performed in order to determine whether a data structure or other description corresponding to the particular OS instance is present. For example, in one embodiment such descriptions may be stored in a storage 460 as depicted in FIG. 4. If it is determined that no resourced OS instance exists (decision block 602), an OS instance is created (block 604) and initialized (block 606). In one embodiment, creation of an OS instance may entail the generation of a data structure or other description of a particular OS instance. Initialization (block 606) may include initializing a host ID, a MAC address, a bootpath, and so on. Subsequent to initialization (block 606), or in the event a resourced OS instance does exist (decision block 602), an evaluation is made (block 608) to determine whether the resources allocated for the OS instance meet the OS instance requirements. If the resources are not adequate (decision block 610), a provisioning activity is performed (block 612) in order to attempt to meet the resource requirements of the OS instance. In one embodiment, domains may be created and/or destroyed in order to satisfy the requirements of an OS instance. Subsequently, another evaluation (block 608) and adequacy check (decision block 610) are performed.

When it is determined that the resources are adequate, a determination is made as to whether or not there is an indication that the OS instance is to be placed in a standby mode (decision block 614). For example, the stored description for a particular OS instance may include a variable whose value indicates the OS instance is to be either "on" or placed in a "standby" mode. If a standby mode is indicated, then the flow as indicated in FIG. 6 completes. If a standby mode is not indicated (decision block 614), the services corresponding to the OS instance are started (block 616). In various embodiment, services which are started may include console, interaction, and monitoring services. Subsequent to starting the appropriate services, the OS instance is booted (block 618).

In one embodiment, as part of the process of provisioning, a service processor may determine that it needs to force one or more lower priority OS instances to relinquish resources in order that they be reassigned to meet the needs of a higher priority OS instance. If the act of relinquishing a resource drops the resources of an OS instance below its minimum requirements, then that OS instance may be stopped by the service processor.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A method for managing operating system instances in a computing system, the method comprising:
   initializing construction of a defined operating system instance;
   detecting specified resources which correspond to the operating system instance;
   specifying resources for the operating system instance, wherein said specifying includes adding resources to the defined operating system instance;
   storing a description of the defined operating system instance; and
   booting an operating system instance, wherein booting the defined operating system instance comprises:
      determining whether a resourced operating system instance exists;
      determining whether resources allocated for the resourced operating system instance are adequate; and
      performing a provisioning activity to allocate resources to the resourced operating system instance, in response to determining resources allocated for the resourced operating system are not adequate.

2. The method as recited in claim 1, further comprising:
   determining whether a personality parameter corresponding to the defined operating system instance is indicated; and
   assigning to the defined operating system instance initial values and attributes corresponding to a predetermined profile, in response to determining a personality parameter which corresponds to the profile is indicated.

3. The method as recited in claim 2, further comprising assigning to the defined operating system instance default initial values and attributes, in response to determining no personality parameter is indicated.

4. The method as recited in claim 2, further comprising detecting user specified parameters and modifying resources specified for the defined operating system instance responsive to the user specified parameters.

5. The method as recited in claim 1, wherein in response to determining no resourced operating system instance exists, the method further comprises:
   creating a first operating system instance; and
   initializing the first operating system instance.

6. The method as recited in claim 5, wherein initializing the first operating system instance comprises initializing one or more of a host ID, a MAC address, and a bootpath.

7. The method as recited in claim 1, further comprising:
   placing the resourced operating system instance in a standby mode, in response to determining a standby mode is indicated for the resourced operating system instance; and
   booting an operating system instance corresponding to the resourced operating system instance, in response to determining a standby mode is not indicated for the resourced operating system instance.

8. A computing system configured to manage operating system instances, the system comprising:
   a storage unit configured to store data; and
   a service processor configured to:
      initialize construction of a defined operating system instance;
      detect specified resources which correspond to the operating system instance;
      specify resources for the operating system instance, wherein said specifying includes adding resources to the defined operating system instance;
      store a description of the defined operating system instance in the storage unit; and
      boot an operating system instance, wherein in booting the operating system instance, the control unit is configured to:
         determine whether a resourced operating system instance exists;
         determine whether resources allocated for the resourced operating system instance are adequate; and
         perform a provisioning activity to allocate resources to the resourced operating system instance, in response to determining resources allocated for the resourced operating system are not adequate.

9. The system as recited in claim 8, wherein the service processor is further configured to:
   determine whether a personality parameter corresponding to the defined operating system instance is indicated; and
   assign to the defined operating system instance initial values and attributes corresponding to a predetermined profile, in response to determining a personality parameter which corresponds to the profile is indicated.

10. The system as recited in claim 9, wherein the service processor is further configured to assign to the defined operating system instance default initial values and attributes, in response to determining no personality parameter is indicated.

11. The system as recited in claim 9, wherein the service processor is further configured to detect user specified parameters and modify resources specified for the defined operating system instance responsive to the user specified parameters.

12. The system as recited in claim 8, wherein in response to determining no resourced operating system instance exists, the wherein the service processor is further configured to:
    create a first operating system instance; and
    initialize the first operating system instance.

13. The system as recited in claim 12, wherein initializing the first operating system instance comprises initializing one or more of a host ID, a MAC address, and a bootpath.

14. The system as recited in claim 8, wherein the service processor is further configured to:
    place the resourced operating system instance in a standby mode, in response to determining a standby mode is indicated for the resourced operating system instance; and
    boot an operating system instance corresponding to the resourced operating system instance, in response to determining a standby mode is not indicated for the resourced operating system instance.

15. A computer readable storage medium comprising program instructions for managing operating system instances, wherein the program instructions are executable to:
    initialize construction of a defined operating system instance;
    detect specified resources which correspond to the operating system instance;

specify resources for the operating system instance, wherein said specifying includes adding resources to the defined operating system instance;

store a description of the defined operating system instance; and boot an operating system instance, wherein in booting the operating system instance, the program instructions are executable to:

determine whether a resourced operating system instance exists;

determine whether resources allocated for the resourced operating system instance are adequate; and perform a provisioning activity to allocate resources to the resourced operating system instance, in response to determining resources allocated for the resourced operating system are not adequate.

16. The computer readable storage medium as recited in claim 15, wherein in response to determining no resourced operating system instance exists, the program instructions are executable to:

create a first operating system instance; and initialize the first operating system instance.

17. The computer readable storage medium as recited in claim 16, wherein initializing the first operating system instance comprises initializing one or more of a host ID, a MAC address, and a bootpath.

18. A method for managing operating system instances in a computing system, the method comprising:

initializing construction of a defined operating system instance;

detecting specified resources which correspond to the operating system instance;

specifying resources for the operating system instance, wherein said specifying includes adding resources to the defined operating system instance;

storing a description of the defined operating system instance;

determining whether a personality parameter corresponding to the defined operating system instance is indicated;

assigning to the defined operating system instance initial values and attributes corresponding to a predetermined profile, in response to determining a personality parameter which corresponds to the profile is indicated; and detecting user specified parameters and modifying resources specified for the defined operating system instance responsive to the parameters.

19. A computing system configured to manage operating system instances, the system comprising:

a storage unit configured to store data; and a service processor configured to:

initialize construction of a defined operating system instance;

detect specified resources which correspond to the operating system instance;

specify resources for the operating system instance, wherein said specifying includes adding resources to the defined operating system instance;

store a description of the defined operating system instance in the storage unit;

determine whether a personality parameter corresponding to the defined operating system instance is indicated;

assign to the defined operating system instance initial values and attributes corresponding to a predetermined profile, in response to determining a personality parameter which corresponds to the profile is indicated; and detect user specified parameters and modify resources specified for the defined operating system instance responsive to the parameters.

20. A computer readable storage medium comprising program instructions for managing operating system instances, wherein the program instructions are executable to:

initialize construction of a defined operating system instance;

detect specified resources which correspond to the operating system instance;

specify resources for the operating system instance, wherein said specifying includes adding resources to the defined operating system instance;

store a description of the defined operating system instance;

determine whether a personality parameter corresponding to the defined operating system instance is indicated;

assign to the defined operating system instance initial values and attributes corresponding to a predetermined profile, in response to determining a personality parameter which corresponds to the profile is indicated; and detect user specified parameters and modify resources specified for the defined operating system instance responsive to the parameters.

* * * * *